United States Patent [19]

Akerberg

[11] Patent Number: 4,709,402

[45] Date of Patent: Nov. 24, 1987

[54] METHOD OF SYNCHRONIZING RADIO TRANSMITTERS FOR SYNCHRONOUS RADIO TRANSMISSION

[75] Inventor: Dag E. Akerberg, Jarfalla, Sweden

[73] Assignee: Telefonaktiebolaget LM Ericsson, Stockholm, Sweden

[21] Appl. No.: 921,740

[22] Filed: Oct. 22, 1986

Related U.S. Application Data

[63] Continuation-in-part of Ser. No. 626,867, Jun. 29, 1984, abandoned.

[30] Foreign Application Priority Data

Sep. 12, 1982 [SE] Sweden ........................ 8207043
Jul. 12, 1983 [WO] PCT Int'l Appl. ... PCT/SE83/00436

[51] Int. Cl.[4] .................... H04B 1/00; G08S 5/22
[52] U.S. Cl. .................................... 455/51; 455/69; 340/825.44
[58] Field of Search ................. 455/18, 51, 53, 57, 455/52, 68, 69, 77, 76, 75; 340/825.44

[56] References Cited

U.S. PATENT DOCUMENTS

| | | | |
|---|---|---|---|
| 4,019,138 | 4/1977 | Wantanabe et al. | 455/69 |
| 4,117,405 | 9/1978 | Martinez | 455/51 |
| 4,208,630 | 6/1980 | Martinez | 455/51 |

*Primary Examiner*—Robert L. Griffin
*Assistant Examiner*—Curtis Kuntz
*Attorney, Agent, or Firm*—Roberts, Spiecens & Cohen

[57] ABSTRACT

In transmission by radio of personal paging calls synchronous radio transmission from several transmitters is often used, i.e. the transmitters send on the same frequency. The characters of the call must also be sent simultaneously from the transmitters so that they shall be correctly comprehended by the receivers. A method and an apparatus are described here for synchronizing the separate transmitters (2:2, 3:16) such as to transmit on the same frequency.

6 Claims, 7 Drawing Figures

SUBORDINATE STATION 2

SUBORDINATE STATION 2

PRIMARY OR SECONDARY STATION IN ADJUSTMENT MODE

METHOD OF SYNCHRONIZING RADIO TRANSMITTERS FOR SYNCHRONOUS RADIO TRANSMISSION

REFERENCE TO OTHER APPLICATIONS

This is a continuation-in-part of application Ser. No. 626,867, filed June 29, 1984 now abandoned.

TECHNICAL FIELD

The present invention relates to a method of synchronizing radio transmitters for synchronous radio transmission and an apparatus for carrying out a part of the method.

BACKGROUND ART

For transmitting short messages by radio, particularly messages containing personal paging calls, it is usual to use a large number of radio transmitters, each with a limited range. Such transmitters are adapted for synchronous radio transmission, i.e. all of them send the same message with the same frequency. The transmission is of the binary frequency modulation (frequency shift keying, FSK)type. The transmitters are further adapted for sending the message bits simultaneously. In known installations for sending personal paging calls the method of transmission is normally:

Transmission on a line of a message from a central station to all radio stations simultaneously; and transmission of the message by radio with differences in propagation time on different lines first being compensated, so that the message is transmitted simultaneously from all radio transmitters.

An example of a system for nation-wide transmission of personal paging calls is described in "Final Report of the Brittish Post Office Code Standardisation Advisory Group (POCSAG)", London 1978. A method of providing simultaneousness in the transmission of the message with use of time signals sent by broadcasting is also described in EP-A-0042144.

When the same message is sent by radio from several transmitters simultaneously, it is unavoidable that some receivers will receive the transmission from two radio transmitters. If the radio transmitters have exactly the same frequency, their field strengths may be combined to an increased field strength and good reception obtained, but in another place approximately a quarter wavelength away, their field strengths can cancel each other so that reception is made impossible. The disadvantage of fading field strength in certain places, standing waves, is mitigated by the frequencies of two adjacent transmitters being given a small offset. Instead of quite zones, beats will then occur with the frequency difference, which can be of the order of magnitude 500 Hz, while the nominal frequency may be 150 MHz, for example. The beats affect the ability of receiving the separate binary characters in the message, for which reason the bit frequency in the transmission should not exceed the beat frequency.

The true carrier frequency of the transmitters may deviate from the selected frequency by 50 Hz at most. The frequency stability requirement is thus high, and it has so far been met by using high-stability transmitters of by transmitting signals on a radio link for synchronizing the carrier frequency of the transmitters. Both methods result in expensive installations.

In a receiver which is situated such that the transmission from two transmitters is received in it, the separate characters must arrive simultaneously, or otherwise there will be uncertainty as to when the character begins and ends. It is considered that the uncertain part of a character should not exceed 20% of the character length, and with a character rate of for example 512 bits/s applicable for the mentioned POCSAG system the uncertainty may be a maximum of 250 micro-seconds.

Radio receivers for the reception of coded personal paging calls are described, inter alia, in the U.S. Pat. No. 3,835,394.

DISCLOSURE OF INVENTION

An object of the invention is to state how the radio transmitters shall be synchronized for sending with a small pre-selected frequency difference. The synchronization takes place in each particular radio transmitter, and it is carried out progressively, so that it begins in the transmitters closest to the central station and is spread like a wave to station farther and farther away from the central station, a common time signal transmitter being superfluous.

BRIEF DESCRIPTION OF DRAWING

Other objects, the features and advantages of the invention will be apparent from the following detailed description when read with the accompanying drawing, whereon.

EMBODIMENT OF INVENTION

There will be described below how the invention is applied to an installation, selected as an example, for personal paging with the aid of radio signals. In certain respects, the installation is implemented as described in the mentioned POCSAG report, namely such that the carrying frequency of the radio signals is about 150 MHz, the frequency offset between transmitters is 500 or 1000 Hz, frequency deviation is permitted to be at most 50 Hz, the transmission is modulated with two frequencies having a difference of 9 kHz, and the time difference for characters sent from different transmitters is allowed to be at most 250 micro-seconds.

The invention may also be applied to installations for which other specifications than the one illustrated here apply.

Figure 1:
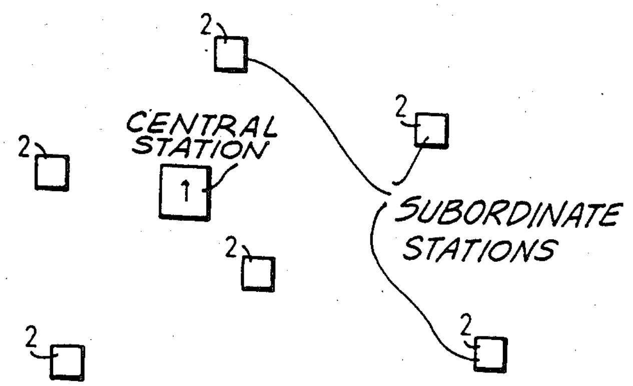
FIG. 1 illustrates an installation with a central station and a plurality of subordinate radio stations.

It is typical for installations for sending personal paging calls and also applicable to the installation used in the embodiment, that a central station 1 be included, as illustrated in FIG. 1. The transmission of personal paging calls in an extensive area is administered by the central station, from which such calls are sent out by radio to paging receivers within the range of the station and on a line to subordinate radio stations 2, which are to send out calls where the central station radio transmission cannot be comprehended.

The subordinate radio stations 2 are disposed such as to send the same call message as the central station 1, and to send it simultaneously as it is sent from the central station and on the same radio frequency, or on a frequency with a preselected offset from this frequency.

Figure 2:
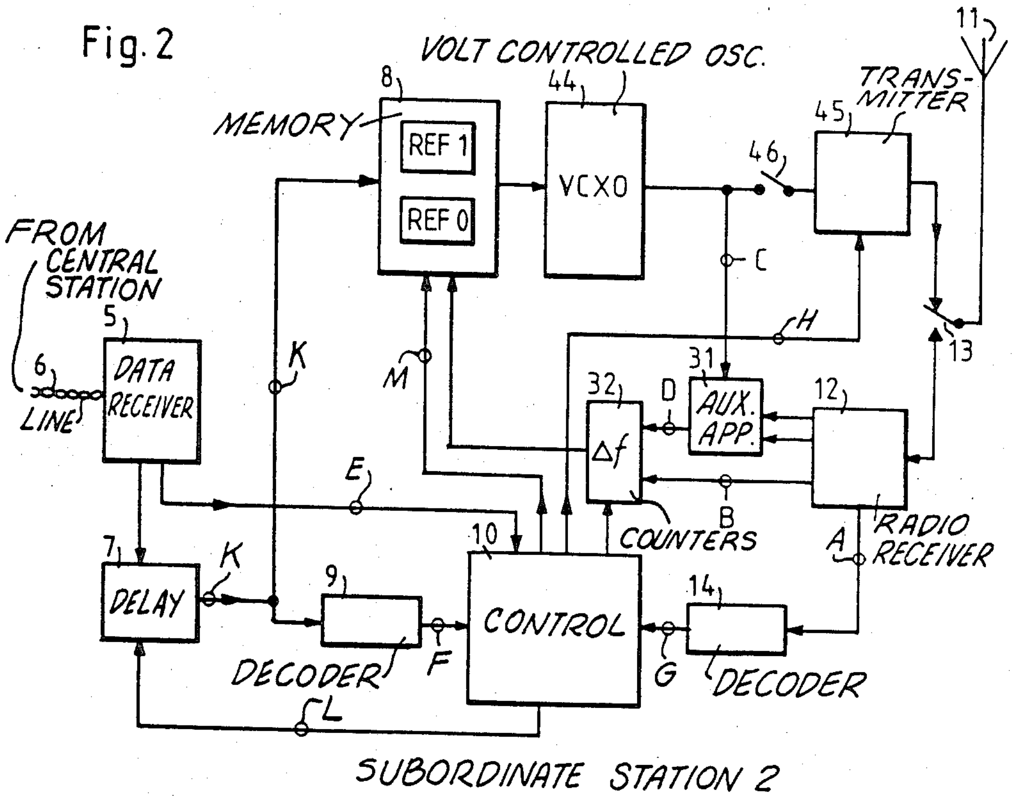
FIG. 2 illustrates a block diagram for a radio station.
Figure 6:
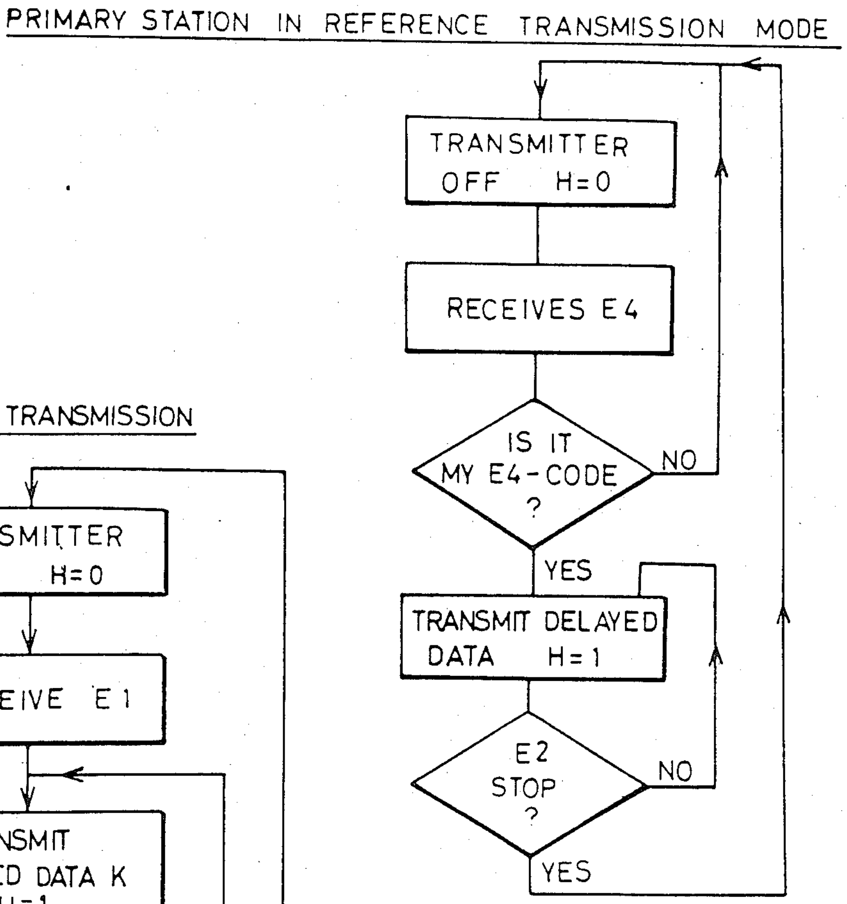
FIGS. 5, 6 and 7 are flow charts for explaining operations of the system.
Figure 5:
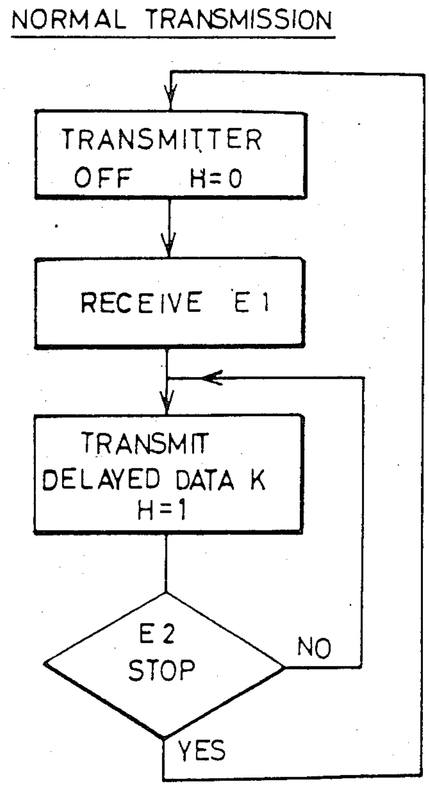
Figure 7:
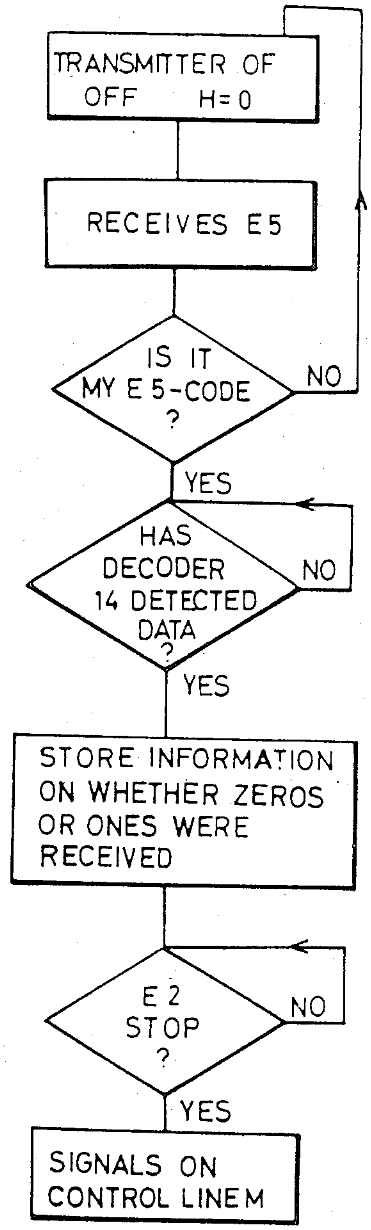

In the installation where the present invention shall be applied a subordinate radio station 2, which is illustrated in FIG. 2, is equipped, inter alia with a data receiver 5 for receiving a message sent on a line 6 from the central station 1. The message passes a delaying circuit 7 for delaying by a time Tc before being fed via line K to memory 8. Memory 8 which can include a digital-to-analog converter merely converts the "1"s and "0"s of the data to one voltage or another to provide control signals for the voltage-controlled oscillator 44 which feeds frequency shifted signals to transmitter 45. (The time Tc is specially set for each station so that the message will be simultaneously transmitted from all stations.) In addition, the message is also transmitted from delay 7 via line K, the decoder 9 and line F to control unit 10. (Control unit 10 is a microprocessor whose operation will hereinafter be summarized by means of the flow charts shown in FIGS. 5, 6 and 7.) Control unit 10 receives control words from data receiver 5 to establish the mode of operation of the station, e.g., transmit receivers etc. In accordance with the mode of operation, control unit 10 emits control signals on line L to delay 7, on line M to memory 8 on line H to transmitter 45. A switch 46 is arranged before the transmitter to control the signal input to the transmitter.

The station is further equipped with an antenna 11, alternately transmitting and receiving. A radio receiver 12 can be connected to the aerial by a switch 13 for reception of the same message as is received in the data receiver 5. The message received in the radio receiver is fed via line A, a second decoder 14 and line G to the mentioned control means 10. The control means 10 is also connected to the delay circuit 7 by a line L for transmitting the necessary correction for the delay time Tc.

In accordance with the invention, the setting of the different radio stations on frequency is carried out consecutively, starting with the substation closest to the central station, until setting has been carried out in the most remote station.

Figure 3:
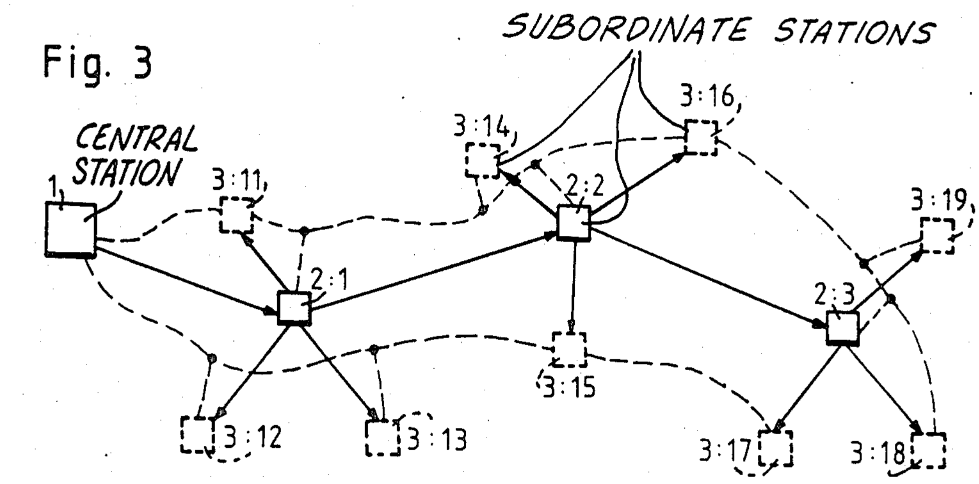
FIG. 3 illustrates a plurality of radio stations connected to a line.

The central station 1 is schematically illustrated in FIG. 3, together with a plurality of the subordinate stations. All the stations are provided with the described transmitters and receivers. Some of the subordinate stations, which may be called primary stations 2:1–2:3, are elevated so that the message can be sent by radio between them over fairly long distances, while other stations, which may be called secondary stations 3:11–3:19 only need to have radio communication with an adjacent primary station.

The radio connections between the stations are denoted by full lines and the wire connections by dashed lines in FIG. 3. The layout of the wire connections is optional, but such that all the subordinate stations are connected to the central station 1. Transmission of personal paging calls by radio from the stations is controlled by the message sent on the line from the central station 1. The propagation time on the line is longest to the most remote station 3:19. If the call message is sent by radio from this station as soon as it has arrived on the line, the message may only be sent after a small delay after arrival at the station 2:3, in order that the message from there will be sent simultaneously.

Where the installation for transmitting personal paging calls contains a large number of subordinate stations 2, these are connected together into several rows of stations with several lines, of the kind illustrated in FIG. 3.

Figure 4:
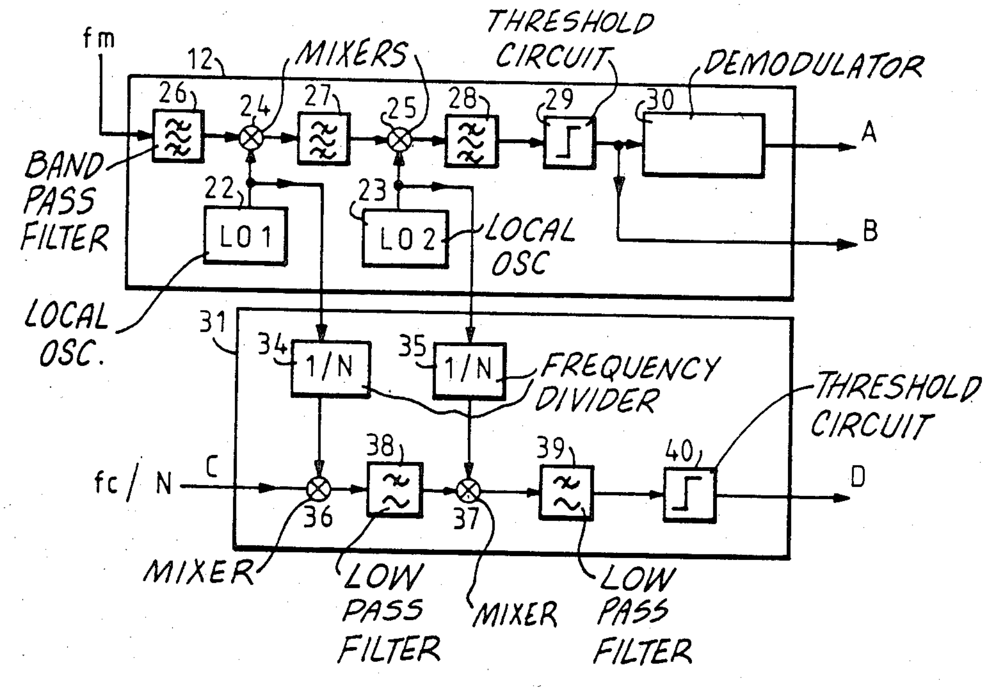
FIG. 4 illustrates a block diagram for a radio receiver and an auxiliary apparatus for synchronization.

In the installation selected as an embodiment, the subordinate radio stations are all equipped with a previously-mentioned radio receiver 12 of the superheterodyne type, known per se, and here of the double superheterodyne type, i.e. as illustrated in FIG. 4 with a first and a second local oscillator 22, 23 a first and second mixer 24, 25 with two intermediate frequencies.

The receiver 21 further contains three bandpass filters 26, 27 and 28 for filtering out undesired signal frequencies, a threshold circuit 29 and a demodulator 30, from the output A of which the received signal is fed to the decoder 14 in FIG. 2.

The second intermediate frequency of the receiver, here about 455 kHz, is taken from the output B after the threshold circuit 29, the signals here having the frequency $F_m - f_{L01} - f_{L02}$Hz, where $f_m$ is the frequency of the received radio signal and $f_{L01}$ and $f_{L02}$ are the frequencies of the respective local oscillators. The frequency of the signal at B is to be used for synchronizing the station radio transmitter to the same frequency as that of the received signal or to a frequency deviating therefrom by a selected amount.

A voltage-controlled crystal oscillator VCXO for the transmission frequency, denoted by 44 in FIG. 2, is arranged in the station and is intended for controlling the frequency of the radio transmitter. The oscillator will be most stable and least temperature-dependent when its control crystal is allowed to oscillate with its natural frequency, which is often lower than the intended transmission frequency. The crystal oscillator 44 is regulated in the installation in question to a frequency $f_c/N$ which is the transmission frequency divided by an integer N, selected within the limits 1 to 9. The output signal of the oscillator, at C in FIG. 2 is fed to an auxiliary apparatus for synchronization in FIG. 4.

The signals of both the local oscillators 22, 23 are taken out and frequency-divided by said integer N in their individual frequency dividers 34, 35. A third and a fourth mixer 36, 37 are arranged in the auxiliary apparatus 31 for mixing the heterodyned frequency of the local oscillators with the frequency of the crystal oscillator. On output D the signal now has the frequency; $(f_c - f_{L01} - f_{L02})/N$ Hz.

A lowpass filter 38, 39 is inserted after each mixer, and a second threshold circuit 40 immediately before the output, for filtering the output signal D. Only pure frequencies are to be found in the auxiliary apparatus 31, it being sufficient to use lowpass filters here instead of bandpass filters.

Comparision of the received frequency with the one generated in the station is arranged such that a number of whole periods of each frequency are counted in two coacting counters 32, with simultaneous starting. When $2^{15}/N$ periods have been counted of the signal on output D, which takes a time of about 72 milliseconds, the count is stopped in both counters. If now $2^{15}$ periods have been counted of the signal on the output B, then $f_c = f_m$; the frequency $f_m$ of the received signal is then the same as the frequency $f_c$ of the internally generated signal. The signal from the crystal oscillator 44 is fed to the radio transmitter 45 of the station, the signal frequency multiplied by N and the transmitter caused to send with the thus-obtained frequency $f_c$ or with a frequency which has a selected offset from this.

Should the number of counted periods at the output B one more than $2^{15}$, then the frequency $f_c$ exceeds that intended by 1/0.072 Hz=14 Hz. For each counted period which the number $2^{15}$ periods is exceeded or is fallen below, the the frequency exceeds or falls below the intended one by 14 Hz. The resolution of the frequency measurement is thus sufficient for the frequency error to be kept under 50 Hz, which is the greatest permitted frequency deviation in the example.

Since the frequencies of the two local oscillators 22, 23 are included in both the frequencies which are compared, their frequencies are without importance in the comparison, no requirement is made of them that they must be accurately stabilized.

The error signal fed out from the counters 32, this signal being a measure of the frequency deviation, is fed into the memory 8, FIG. 2, and thus adjusts the voltage levels REF1 and REF2 which set the voltage controlled oscillator 44 to the intended frequency. The signal fed from there with the frequency $f_c/N$ Hz has, as mentioned, its frequency multiplied by N to become $f_c$ Hz, which is the sending frequency of the transmitter.

A microprocessor in the control unit 10 in each station controls the function of the station by delivering the following control signals. Reference is made to FIG. 2.

E: A signal or word from the data receiver with different meanings:

E1: Start transmitter

E2: Stop transmitter

E3: Go into delay adjustment mode, signal contains a selective code, so that only the stations in which the delay shall be adjusted do respond at a specific occasion.

E4: Start transmitter as reference for adjustment; the signal contains a selective code, only recognized by one primary station at each occasion.

E5: Go into frequency adjustment mode.

F: Well defined pulse at the end of the synchronization code received over the radio receiver.

G: The same pulse as F of the synchronization code received over the radio receiver.

H: Control on/off of the transmitter via the switch 13.

K: Delayed data to the memory 8 which converts high and low data into suitable voltage to modulate the VCXO 44.

L: A signal to adjust the time delay at the delay circuit 7.

M: A signal from the control means 10 to the memory 8 causes the memory 8 to clock in the error signal from counter 32 and correspondingly adjust the voltage level of REF 1 if ones are received and of REF 0 if zeros are received.

Since a one in the message with the synchronization order is transmitted at one frequency and a zero is transmitted at another frequency, a plurality of ones are inserted in sequence in the message, so that a constant frequency is received for a short time when the synchronization is carried out for REF1. The same procedure is repeated for zeros to adjust REF0.

The description of synchronization to the correct frequency is also applicable to radio stations where the receiver is of the superheterodyne type, thus with only one local oscillator. The description is also applicable where the receiver is of the homodyne type, i.e. its intermediate frequency is zero Hz.

It is considered sufficient if the cyrstal oscillator 44 has a frequency stability, which is as good as can be achieved with a control crystal in a temperature-controlled oven or with a temperature-compensated crystal. In order to keep the frequency drift of the oscillator within permitted limits, the synchronization to correct transmission frequency is repeated with an hourly interval in the installation to which the embodiment has been applied, the length of interval which sould be selected in other cases depends on the implementation of the oscillator and the operating conditions. The synchronization only decreases the availability of the transmitter insignificantly, since it is carried out in about 10 seconds.

Synchronization to the right transmission frequency is carried out immediately after a setting for synchronousness in the transmission. Both settings are contained in an order included in the message. This message has the same format as a message transmitted for personal paging, but with a somewhat different content so that it is not confused with a personal paging call.

I claim:

1. In a radio communication system having a central radio station connected by lines to a plurality of other radio stations for transmitting messages to receivers, the method of controlling the transmitting frequency of the carrier signal of a first of the other radio stations to have a given relationship with the transmitting frequency of the carrier signal of a second of the radio stations comprising the steps of the central station sending on the lines to the first and second other radio stations order messages for ordering said other radio stations to adjust the transmitting frequencies of their carrier signals, the second other radio station in response to the receipt of said order message transmitting with its own transmitting frequency said order message over the air to said first other radio station, said first other radio station in response to the receipt of said order message on a line from the central station being activated to receive over the air messages from the second radio station, said first radio station comparing the transmission frequency of the order message received over the air from the second other radio station with its own carrier signal's transmission frequency, said comparing step comprising counting a number of cycles of a signal derived from the order message received from the second radio station, counting a number of cycles of a signal derived from its own carrier frequency and comparing the counts, and said first radio station adjusting its own carrier signal's transmission frequency in accordance with the results of the comparision.

2. The method of claim 1 wherein when one of the counting steps of a given number of cycles is counted both counting steps are terminated.

3. The method of claim 2 wherein the amount of adjusting is a function of the difference between said given number of cycles and the number of cycles counted during the other of the counting steps.

4. In a transceiver having a receiver and a transmitter, apparatus for adjusting the frequency of the carrier signal of the transmitter with respect to the carrier frequency of a signal received by the receiver comprising controllable oscillator means for generating the carrier signal, said oscillator means having an input means receiving a count value for controlling the frequency of the carrier signal, first counting means responsive to said oscillator means for counting the number of cycles carrier signal, second counting means responsive to said receiver for counting the number of cycles of the received signal, comparing means comparing the counts accumulated by said counting means over a given time interval for generating a count value representing the difference of said counts, and means for feeding the count value generated by said comparing means to the input means of said controllable oscillator means.

5. In a transceiver including a receiver of the double superheterodyne type having first and second local oscillators with first and second intermediate frequencies which receives message carrier signals and having a transmitter which transmits modulated carrier signals, apparatus for adjusting the frequency of the carrier signal of the transmitter to the frequency of the message carrier signals comprising:

a voltage controlled oscillator for generating a signal which has a frequency equal to 1/N of the frequency of the carrier signal of the transmitter;

first frequency divider means connected to the first local oscillator for generating a first frequency divided signal having a frequency equal to 1/N of the frequency of the first intermediate frequency;

second frequency divider means connected to the second local oscillator means for generating a second frequency divided signal having a frequency equal to 1/N of the frequency of the second intermediate frequency;

a first mixer means having a first input for receiving the signal from said voltage controlled oscillator, a second input for receiving the signal from said first frequency divider means and an output for generating a signal having a frequency equal to the difference in the frequencies of the signals received at said first and second inputs;

a second mixer means having a first input for receiving the signal from the output of said first mixer means, a second input for receiving the signal from said second frequency divider means and an output for transmitting a signal having a frequency which is the difference in frequencies of the signals received at the first and second inputs; and comparing means having first and second compare inputs for receiving signals after heterodyning by the receiver and the signal from the output of said second mixer means and an output for generating a control signal which is a function of the difference in frequencies of the signals received at the inputs;

control means utilizing said control signal for controlling the frequency of said voltage controlled oscillator; and means in said transmitter for utilizing the signal from said voltage controlled oscillator to produce the carrier signal.

6. The apparatus of claim 5 wherein said comparing means comprises counting means for counting the number of cycles of each of the signals received at said compare inputs over a period of time, and means for generating said control signal having a value related to the difference in the counts.

* * * * *